US011139474B2

(12) United States Patent
Ayme-Perrot et al.

(10) Patent No.: US 11,139,474 B2
(45) Date of Patent: Oct. 5, 2021

(54) METHOD FOR MANUFACTURING AN SN:SB INTERMETALLIC PHASE

(71) Applicants: Hutchinson, Paris (FR); Centre National de la Recherche Scientifique, Paris (FR); Université De Montpellier, Montpellier (FR)

(72) Inventors: David Ayme-Perrot, Huningue (FR); Philippe Sonntag, Avon (FR); Philippe Antitomaso, Montpellier (FR); Laure Monconduit, Jacou (FR); Francoise Morato-Lallemand, Grabels (FR); Philippe Girard, Chateaufort en Yvelines (FR)

(73) Assignees: HUTCHINSON, Paris (FR); CENTRE NATIONAL DE LA RECHERCHE SCIENTIFIQUE, Paris (FR); UNIVERSITÉ DE MONTPELLIER, Montpellier (FR)

( * ) Notice: Subject to any disclaimer, the term of this patent is extended or adjusted under 35 U.S.C. 154(b) by 304 days.

(21) Appl. No.: 15/353,250

(22) Filed: Nov. 16, 2016

(65) Prior Publication Data
US 2017/0141388 A1     May 18, 2017

(30) Foreign Application Priority Data

Nov. 16, 2015  (FR) ...................................... 1561015

(51) Int. Cl.
*H01M 4/38*   (2006.01)
*C22C 1/04*   (2006.01)
(Continued)

(52) U.S. Cl.
CPC ............... *H01M 4/387* (2013.01); *B22F 9/04* (2013.01); *C22C 1/02* (2013.01); *C22C 1/04* (2013.01);
(Continued)

(58) Field of Classification Search
CPC .......... H01M 4/387; C22C 1/04; C22C 12/00; C22C 1/0491; C22C 13/02; C22C 1/00;
(Continued)

(56) References Cited

U.S. PATENT DOCUMENTS

| 5,194,408 A | * | 3/1993 | Stamp | B65D 81/3446 426/234 |
| 2013/0316238 A1 | * | 11/2013 | Nishimura | B22F 1/0018 429/219 |
| 2014/0178761 A1 | | 6/2014 | Lu et al. | |

FOREIGN PATENT DOCUMENTS

CN            1688044 A  *  10/2005

OTHER PUBLICATIONS

Lakshmi et al., "Analysis of conventional and microwave synthesized tin antimony nano particles," J. Chemical and Pharmaceutical Sciences 11, 99-100 (Oct. 2015). (Year: 2015).*

(Continued)

*Primary Examiner* — Paul A Wartalowicz
*Assistant Examiner* — Ryan L Heckman
(74) *Attorney, Agent, or Firm* — Oliff PLC

(57) ABSTRACT

A method for preparing a material having an Sn:Sb intermetallic phase includes at least the steps of mixing chemical elements Sn and Sb, and treating the mixture with microwaves. An electrode is manufactured by using the material having an Sn:Sb intermetallic phase; forming the material in a form of powder; mixing the powder with carbon, a binder and a solvent to form an ink; coating a current collector with the ink; and drying the electrode.

12 Claims, 8 Drawing Sheets

Figure 1A:
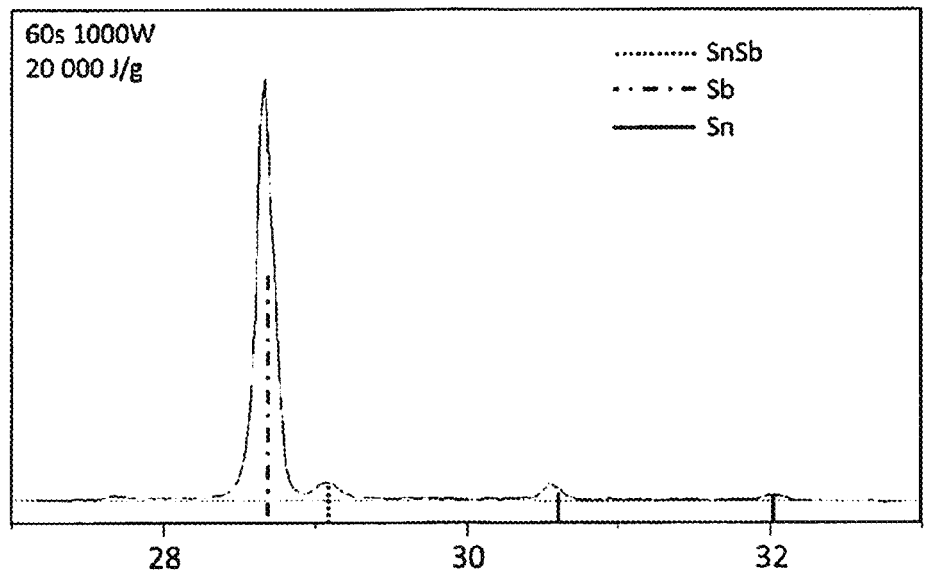

(51) Int. Cl.
| | |
|---|---|
| B22F 9/04 | (2006.01) |
| C22C 1/02 | (2006.01) |
| C22C 12/00 | (2006.01) |
| C22C 13/02 | (2006.01) |
| H01M 4/04 | (2006.01) |
| H01M 4/62 | (2006.01) |
| H01M 10/0525 | (2010.01) |
| H05B 6/64 | (2006.01) |
| H05B 6/80 | (2006.01) |
| B22F 3/105 | (2006.01) |

(52) U.S. Cl.
CPC ............ *C22C 1/0483* (2013.01); *C22C 12/00* (2013.01); *C22C 13/02* (2013.01); *H01M 4/0404* (2013.01); *H01M 4/622* (2013.01); *H01M 4/625* (2013.01); *H01M 10/0525* (2013.01); *H05B 6/6491* (2013.01); *H05B 6/80* (2013.01); *B22F 2003/1054* (2013.01)

(58) Field of Classification Search
CPC ...... H05B 6/64; B22F 2003/1054; B22F 9/02; B22F 9/00
See application file for complete search history.

(56) References Cited

OTHER PUBLICATIONS

Kitchen et al. "Modern Microwave Methods in Solid-State Inorganic Materials Chemistry: From Fundamentals to Manufacturing," Chem. Rev. 114, 1170-1206 (2014). (Year: 2014).*

Yang et al., "Sub-Microcrystalline Sn and Sn—SnSb Powders as Lithium Storage Materials for Lithium-Ion Batteries," Electrochem. Solid-State Letters 2, 161-163 (1999). (Year: 1999).*

Saxena et al. "Chapter 1. Microwave Synthesis: A Physical Concept" in "Microwave Heating," U. Chandra (Ed.), (Jul. 2011), ISBN: 978-953-307-573-0. (Year: 2011).*

"Introduction to Phase Diagrams," Alloy Phase Diagrams. vol. 3, ASM Handbook, ASM International, 2016. https://matdata.asminternational.org/hbk/index.jsp (Year: 2016).*

Gedevanishvili et al., "Microwave combustion synthesis and sintering of intermetallics and alloys," J. Materials Science Letters 18, 665-666 (1999). (Year: 1999).*

Fernandez-Madrigal et al., "X-ray Diffraction, 7Li MAS NMR Spectroscopy, and 119Sn Mossbauer Spectroscopy Study of SnSb-Based Electrode Materials") Chem. Mater. 14, 2962-2968 (2002). (Year: 2002).*

Okamoto, "Desk Handbook: Phase Diagrams for Binary Alloys" (Second Edition, 2010, ASM International), title pages and preface. (Year: 2010).*

Ding et al., "Rapid microwave-assisted flux growth of pure b-NaYF4:Yb3+, Ln3+ (Ln = Er, Tm, Ho) microrods with multicolor upconversion luminescence" Chem. Eng. J. 241, 477-484 (2014). (Year: 2014).*

Biswas et al., "Rapid microwave synthesis of indium filled skutterudites: An energy efficient route to high performance thermoelectric materials" Materials Res. Bull. 46, 2288-2290 (2011). (Year: 2011).*

Gaustad, Gabrielle, et al. "Susceptor Investigation for Microwave Heating Applications." Ceramic Transactions Series Innovative Processing and Synthesis of Ceramics, Glasses and Composites VIII, 2012, pp. 23-35 (Year: 2012).*

Zhou, Gen-Tao, et al. "Microwave-Assisted Selective Preparation and Characterization of Li21Si5 and Li17Sn4." Journal of Solid State Chemistry, vol. 177, No. 9, 2004, pp. 3014-3020 (Year: 2004).*

Ren, Xiangzhong. "SnSbCux Alloy Composite Anode Materials for High Performance Lithium-Ion Batteries." International Journal of Electrochemical Science, 2016, pp. 9508-9518 (Year: 2016).*

Azrina, Arshad, et al. "Effect of Powder Particle Size of Tin Based Alloy Sintered via Hybrid Microwave and Conventional Furnace." Applied Mechanics and Materials, vol. 575, 2014, pp. 160-164 (Year: 2014).*

Machine Translation of CN-1688044-A (Year: 2005).*

Chen et al., "Graphene supported Sn—Sb©Carbon core-shell particles as a superior anode for lithium ion batteries," Electrochem. Commun. 12, 1302-1306 (2010).

Fan et al., "Comparison between SnSb—C and Sn—C composites as anode materials for lithium-ion batteries," RSC Adv. 4, 62301-62307 (2014).

Gao et al., "Microwave rapid preparation of $LiNi_{0.5}Mn_{1.5}O4$ and the improved high rate performance for lithium-ion batteries," Electrochim. Acta 100, 125-132 (2013).

Gedye et al., "The Use of Microwave Ovens for Rapid Organic Synthesis," Tetrahedron Lett. 27, 279-282 (1986).

Jiang et al., "Effect of heat treatment temperature on the electrochemical properties of SnSb-based Cu electrodes for lithium batteries," Appl. Surf. Sci. 321, 109-115 (2014).

Kadhim et al., "Characterizations of solid-state microwave-synthesized Sb2Te3-based alloys with various compositions of bismuth in $Bi_{2x}Sb_{2(1-x)}Te_3$," Mater. Sci. Semicond. Process. 15, 549-554 (2012).

Kim et al., "Synthesis of VBO3-carbon composite by ball-milling and microwave heating and its electrochemical properties as negative electrode material of lithium ion batteries," J. Alloys Compd. 542, 132-135 (2012).

Lakshmi et al., "Analysis of conventional and microwave synthesized tin antimony nano particles," Journal of Chemical and Pharmaceutical Sciences, special issue 11, (2015) 99-101.

Lee et al., "Optimization of microwave synthesis of $Li[Ni_{0.4}Co_{0.2}Mn_{0.4}]O_2$ as a positive electrode material for lithium batteries," Electrochim. Acta 53, 3065-3074 (2008).

Li et al., "Microwave solid-state synthesis of spinel $Li_4Ti_5O_{12}$ nanocrystallites as anode material for lithium-ion batteries," Solid State Ionics 178, 1590-1594 (2007).

Li et al., "Spherical nano-SnSb/MCMB/carbon core-shell composite for high stability lithium ion battery anodes," Electrochim. Acta 113, 505-513 (2013).

Mastrovito et al., "Rapid solid-state synthesis of binary group 15 chalcogenides using microwave irradiation," J. Solid State Chem. 180, 3262-3270 (2007).

Park et al., "A mechano- and electrochemically controlled SnSb/C nanocomposite for rechargeable Li-ion batteries," Electrochim. Acta 54, 6367-6373 (2009).

Song et al., "Simple and fast synthesis of $LiFePO_4$—C composite for lithium rechargeable batteries by ball-milling and microwave heating," J. Power Sources 166, 260-265 (2007).

Trifonova et al., "Influence of the reductive preparation conditions on the morphology and on the electrochemical performance of Sn/SnSb," Solid State Ionics 168, 51-59 (2004).

Wang et al., "The improved electrochemical performance of SnSb-based alloy anode materials for Li-ion batteries," J. Alloys Compd. 472, 55-58 (2009).

Xue et al., "A simple method to encapsulate SnSb nanoparticles into hollow carbon nanofibers with superior lithium-ion storage capability," J. Mater. Chem. A 1, 13807 (2013).

Yang et al., "Temperature controlled microwave solid-state synthesis of $Li_3V_2(PO_4)_3$ as cathode materials for lithium batteries," J. of Power Sources 195, 5374-5378 (2010).

* cited by examiner

METHOD FOR MANUFACTURING AN SN:SB INTERMETALLIC PHASE

The present invention relates to a method for preparing an SnSb intermetallic phase, said method comprising a microwave-assisted synthesis step. The invention also relates to the uses of the material thus obtained, notably for manufacturing lithium-ion battery electrodes. The materials obtained by the method of the invention have improved properties relative to the materials of the same nature or of a comparable nature when they are used in anodes of lithium-ion batteries.

BACKGROUND

Lithium-ion batteries constitute the most commonly used rechargeable power source in portable electronics on account of their high energy density and their low-pollution character. They could also be used in larger-scale energy storage systems, for example for driving electric vehicles. However, these applications require batteries with high performance notably in terms of energy density, flow capacity, service life, and cost of production.

Tin-based anode materials are considered to be very promising in the field of rechargeable lithium-ion batteries, on account of their high volume density and their high mass energy density. However, their high storage capacity for lithium ions leads to changes in volume of these materials at the time of uptake and release of lithium ions. These volume changes lead to embrittlement of the anode (cracking, disintegration) and consequently affect the cycling capacities of the electrode. One approach for overcoming this difficulty lies in the formation of electrodes from tin-based alloys or composites, in which the different elements react with lithium at different stages of the charge/discharge cycle. Thus, the various compounds perform the role of buffer with respect to the volume changes caused by the other compounds. Materials based on tin and antimony, and notably SnSb, are particularly interesting on account of their capacity to react with large amounts of Li per unit of formula. The theoretical specific capacities of Sn and Sb are 993 and 660 mA·h·g$^{-1}$ respectively. Tin and the antimony are capable of forming alloys with high lithium content ($Li_7Sn_2$ and $Li_3Sb$), giving rise to high capacities. The theoretical capacity of SnSb is 825 mAh/g, which makes it a particularly attractive active anode material for Li-ion batteries. As an example, graphitic carbon, which is the most widely used anode material, has a theoretical capacity of 370 mAh/g.

The volume changes of Sn and Sb, of 250% and 150% respectively, at the time of lithium insertion and extraction, lead to a limited service life of these materials.

The solutions proposed in the prior art for overcoming these drawbacks consisted of proposing intermetallic nanostructures or composite structures based on another element such as carbon, which is able to absorb the volume changes of the metal.

The drawback of the composites is that a high irreversible capacity (up to 50%) in the first cycle is measured when they are tested electrochemically relative to the metallic lithium in a battery. Moreover, a high proportion of carbon in these composites means a low density of the whole, which imposes a high penalty on the volume capacity.

Certain authors describe formulations using a low proportion of conductive additive, carbon or nickel (of the order of 10%) or formulations without a conductive additive. However, these formulations give a low number of cycles (50 cycles maximum).

The electrode formulations based on SnSb described in the literature generally use a large amount of carbon, which is added to the carbon already present in certain composites, which has the consequence of lowering the volume capacity and increasing the irreversible capacity in the 1st cycle.

The intermetallic material SnSb can be synthesized by mechanosynthesis (Park, C. M. & Sohn, H. J. A, *Electrochim. Acta* 54, 6367-6373 (2009)), but more often it is carried out in solution starting from chlorinated or oxidized precursors. The use of a solution process necessarily involves a drying step. This synthesis is often associated with forming steps such as electrospinning (Xue, L. et al., *J. Mater. Chem. A* 1, 13807 (2013)). It may also require an autoclaving step (Fan, L. et al., *RSC Adv.* 4, 62301-62307 (2014)). These steps further increase the total synthesis time (from days to weeks).

A thermal treatment is also often used for modifying the morphology of these materials, for example to form carbon-SnSb composites (Jiang, Q., Hu, D., Jia, M. & Xue, R., *Appl. Surf. Sci.* 321, 109-115 (2014); Li, J. et al., *Electrochim. Acta* 113, 505-513 (2013); Chen, S., Chen, P., Wu, M., Pan, D. & Wang, Y., *Electrochem. commun.* 12, 1302-1306 (2010)).

The document Lakshmi D. et al., Journal of Chemical and Pharmaceutical Sciences, special issue 11, (2015) 99-101, describes an alloy of tin and antimony, SnSb. The method for manufacturing this alloy uses chlorides of Sn and Sb as starting product, they are put in solution in the presence of sodium citrate and are submitted to microwave treatment. Then a solution of $NaBH_4$ and NaOH is added dropwise to the resultant product, and the medium is submitted to microwave treatment again. A precipitate forms, which is washed with hydrochloric acid, acetone, and distilled water.

Document US2014/178761 describes a method for manufacturing organometallic compounds based on Sn, Sb and/or Pb, and use thereof in the manufacture of electrodes. This method uses a compound MexCyNzSxxOyy as the starting product, where Me is a metal or a metal alloy, x and y being greater than 0, thus the material is a composite. This compound undergoes pyrolysis to an organometallic compound in the form of metal particles coated with carbides, sulphides, and/or nitrides.

Microwaves have been used as a source of energy in the field of organic chemistry (Gedye, R. et al., *Tetrahedron Lett.* 27, 279-282 (1986)). The initial results obtained from these organic syntheses in a microwave oven demonstrated reaction rates up to 1000 times greater than the conventional heating techniques such as a water bath or a heating cap. Since then, the use of microwaves has developed in other areas, including for the synthesis of electrode materials for batteries.

A certain number of oxides synthesized using microwaves have been used as anode materials for Li-ion batteries (Li, J., Jin, Y., Zhang, X. & Yang, H., *Solid State Ionics* 178, 1590-1594 (2007); Kim, D.-Y., Song, M.-S., Eom, J.-Y. & Kwon, H.-S., *J. Alloys Compd.* 542, 132-135 (2012)) or cathode materials (Yang, G., Liu, H., Ji, H., Chen, Z. & Jiang, X., *J. Power Sources* 195, 5374-5378 (2010); Gao, P. et al., *Electrochim. Acta* 100, 125-132 (2013); Song, M.-S. et al., *J. Power Sources* 166, 260-265 (2007); Lee, K.-S., Myung, S.-T., Prakash, J., Yashiro, H. & Sun, Y.-K., *Electrochim. Acta* 53, 3065-3074 (2008)). The major advantage of microwave synthesis is the extremely short synthesis time, of the order of a minute, relative to all of the other types of synthesis.

In the methods of synthesis using microwaves in the prior art, a preliminary step of synthesis in solution is often necessary for preparing the precursors, which greatly diminishes the advantage of microwave synthesis. In other cases, mechanosynthesis is employed as a preliminary step for forming the precursors, which represents a time constraint and additional manipulation.

Some studies show the advantage of using carbon as a susceptor to obtain extreme temperatures (≈1000° C.) in an extremely short time, and greatly reduce the synthesis time to a time of the order of a minute.

Synthesis of intermetallic phases by microwaves is employed in the field of thermoelectricity (Zhou, S. & Bai, C., *Trans. Nonferrous Met. Soc. China* 21, 1785-1789 (2011); Rocha, G. N. et al., *Mater. Chem. Phys.* 139, 494-499 (2013); Kadhim, A., Hmood, A. & Abu Hassan, *H., Mater. Sci. Semicond. Process.* 15, 549-554 (2012); Mastrovito, C., Lekse, J. W. & Aitken, J. A.; *J. Solid State Chem.* 180, 3262-3270 (2007). The materials whose synthesis was described belong to the class of the rare earths (Gd; Y; Nd), to the class of metals/metalloids (Mg; Bi; Sb; Te; W; Si); only selenium belongs to the class of the non-metals. A preliminary step, prior to microwave synthesis, is once again still necessary, and the least restrictive is simple grinding of the precursors in a mortar for 20 minutes. For synthesis of the non-oxidized materials, the precursors must be put in a sealed tube under vacuum or put directly in a microwave oven under inert atmosphere (argon). Production of oxidized materials is easier, as the synthesis takes place under ambient atmosphere. In order to synthesize a homogeneous product, the precursors must be stirred regularly (every minute) during microwave synthesis, which involves movement of the sample, leading to problems of reproducibility.

Thus, the state of the art shows that microwave synthesis is used for preparing electrode materials, most often metal oxides. It can be seen that it is generally employed following preparatory steps (grinding, mechanosynthesis, preparation of precursors) that are complex, long and expensive.

SUMMARY OF THE INVENTION

The inventors discovered that microwave synthesis made it possible to manufacture, by a method that is simple, quick, reproducible, and easily applied industrially, an intermetallic material SnSb having improved properties relative to the similar materials known from the prior art and relative to the composites comprising them.

The use of microwave synthesis for preparing electrode materials based on an intermetallic phase is not mentioned or suggested at all in the prior art. Nor is there any mention or suggestion in the prior art of using microwave synthesis for preparing a material based on the SnSb intermetallic phase. It was not in any way foreseeable that microwave synthesis would provide an SnSb intermetallic phase starting from commercial raw materials, without complex preliminary steps of chemical or mechanical preparation. It was not in any way foreseeable that microwave synthesis would give an unoxidized SnSb intermetallic phase without having recourse to the use of vacuum or inert atmosphere.

It was not in any way foreseeable that the synthesis of SnSb by a method comprising a step of microwave treatment would give a material having improved performance when it is employed for manufacturing electrodes for Li-ion batteries.

The invention relates to a method for preparing an SnSb intermetallic phase, said method comprising at least the following steps:
a/ mixing the precursors Sn and Sb,
b/ treating the mixture from step a/ with microwaves.

According to a preferred embodiment, the method for preparing an SnSb intermetallic phase consists essentially of the following steps:
a/ mixing the precursors Sn and Sb,
b/ treating the mixture from step a/ with microwaves.

According to a preferred embodiment, the precursors Sn and Sb are used in molar proportions of 30/70, 40/60, 50/50, 60/40 or 70/30.

According to a preferred embodiment, the precursors Sn and Sb are in contact with a susceptor material, for carrying out the microwave treatment.

According to a preferred embodiment, the specific energy of the treatment carried out in step b/ is greater than or equal to 24 000 J per g of susceptor, preferably greater than or equal to 30 000 J per g of susceptor.

According to a preferred embodiment, the susceptor material is a solid.

According to an even more preferred embodiment, the susceptor material is selected from carbon and CuO.

According to an even more preferred embodiment, the susceptor material is carbon and the duration t of microwave treatment is from 90 s to 150 s.

According to another preferred embodiment, the susceptor material is CuO and the duration t of microwave treatment is from 300 s to 600 s.

According to a preferred embodiment, with $m_{(MP)}$ denoting the total weight of the metallic precursors Sn and Sb, and $m_{(S)}$ denoting the weight of susceptor, these weights satisfy the relation:

$$0.1\ m_{(MP)} \leq m_{(S)} \leq 3000\ m_{(MP)}$$

According to a preferred embodiment, the duration of step b/ is greater than or equal to 60 s, better still greater than or equal to 75 s.

According to a preferred embodiment, the precursors Sn and Sb are used in the form of a solid.

According to a preferred embodiment, Sn and Sb are used in the form of powder or pellets.

According to a preferred embodiment, the method is carried out in a substrate made of one of the following materials: alumina ($Al_2O_3$), silica ($SiO_2$).

The invention also relates to a material of the SnSb intermetallic phase type, obtained by the method as described above.

According to a preferred embodiment, this material is an alloy whose composition corresponds to one of the following formulae:

Sn:Sb(3:7),Sn:Sb(2:3),Sn:Sb(1:1),Sn:Sb(3:2) and Sn:Sb(7:3).

The invention also relates to an electrode comprising at least one layer of a composition comprising at least: an intermetallic phase as defined above, an electrically conducting material, a binder.

The invention also relates to a method for manufacturing an electrode, said method comprising at least:
manufacturing an SnSb intermetallic phase by the method as defined above,
forming the SnSb intermetallic phase in the form of powder,
mixing the SnSb intermetallic phase with carbon, a binder and a solvent to form an ink,
coating a current collector with the ink,
drying the electrode.

The method of the invention is much quicker (50 to 500 times quicker) than the methods for synthesis of SnSb known in the prior art. It is particularly simple to carry out, and it does not require a preliminary chemical or mechanical step. Pelletization of the starting material is not necessary.

When the method of the invention is carried out in the presence of carbon as susceptor, the operation may be carried out in the ambient air, while avoiding oxidation of SnSb. In contrast, the previous methods must take place in a sealed tube under vacuum or under argon.

The method of the invention does not require any preliminary forming step, any use of pollutants or effluents for the synthesis, or of gas for reduction. Moreover, the yield of the reaction by weight is close to 100% (weight of the precursors≈weight of the product).

The electrochemical performance associated with the product SnSb obtained by the method of the invention is excellent: thus, very good performance is obtained in terms of capacity, cycling behaviour, irreversible capacity in the first cycle, faradaic efficiency. When SnSb is prepared by much longer and more expensive methods of the prior art, such a set of properties is not obtained simultaneously.

The intermetallic material SnSb obtained by the method of the invention has electrochemical performance equal to or better than that known for SnSb materials of the prior art. Notably, improved performance is observed with respect to limited loss of capacity in the 1st cycle, cycling behaviour, and volume capacity of the electrode, notably because electrodes can be formulated from this SnSb material with a limited amount of added carbon.

The expression "consists essentially of" followed by one or more features signifies that it is possible to include, in the method or material of the invention, besides the components or steps explicitly enumerated, components or steps that do not significantly alter the properties and features of the invention.

DETAILED DESCRIPTION

The method of synthesis of the intermetallic material SnSb advantageously comprises the steps that will be described below.

The intermetallic compound is an alloy of a defined chemical composition that can be obtained under certain conditions of pressure and/or temperature. In contrast to a classical alloy, where atoms of different natures may be distributed randomly at one and the same crystallographic site, an intermetallic compound is constituted of a periodical alternation of atoms.

Intermetallic material SnSb means, in the sense of the invention, the various intermetallic phases made up of tin and antimony atoms in the various possible proportions of these atoms. The expression intermetallic material SnSb therefore notably includes the intermetallic phases:

Sn:Sb (1:1) (where tin and antimony are present in equal molar proportions), but also Sn:Sb (2:3), Sn:Sb (3:7), Sn:Sb (7:3), Sn:Sb (3:2). This definition does not exclude the presence of elements other than Sn and Sb, in minority amounts. It also does not exclude the presence of minority amounts of Sn and/or Sb outside of the intermetallic phase.

The Raw Materials:

The word "precursor" denotes the raw materials or reactants used in the method. The expression "precursors Sn and Sb" therefore denotes the chemical elements Sn and Sb as raw materials used for carrying out the method. This is one of the differences compared to the prior art, which uses precursors such as metal salts, notably chlorides, or metal/organic composites.

Sn and Sb are used in solid form, notably in the form of powder or pellets. This is one of the differences compared to the prior art, which uses precursors in solution. Advantageously, raw materials are used with purity greater than or equal to 95%, preferably greater than or equal to 98%, better still greater than or equal to 99%. The purity of the raw materials is important for certain applications of SnSb, such as the manufacture of electrodes for example, where the presence of impurities might affect the electrochemical properties of these electrodes. Sn and Sb are used in proportions selected depending on the intermetallic phase that we wish to obtain. Molar proportions of Sn and Sb of 30/70, 40/60, 50/50, 60/40 and 70/30 may notably be used. The commercial raw materials may be used directly, without a preparation step, which represents an advantage relative to the methods of the prior art.

The Susceptor:

The reaction is carried out advantageously in the presence of a susceptor. A susceptor is a material capable of absorbing electromagnetic energy (of the microwaves) and releasing it in the form of heat. The presence of the susceptor therefore makes it possible to reduce the reaction time. With an identical treatment energy, the duration of application of the microwaves is reduced when the reaction is carried out in the presence of a susceptor.

Moreover, the presence of a susceptor having reducing properties makes it possible to perform syntheses directly under air, without any constraint on preparation such as putting in a sealed tube under vacuum or under argon. However, it is possible for the synthesis to be carried out under a controlled atmosphere.

The susceptor is advantageously in solid form, preferably selected from carbon, C, and cupric oxide, CuO. The susceptor is preferably carbon, for example carbon black, or a mixture of different types of carbon. Carbon-containing susceptors have reducing properties, allowing the synthesis to be carried out in the ambient air. The thermal conductivity and reducing capacity of carbon black are the two keys parameters of the susceptor. Advantageously, higher thermal conductivities are associated with carbon nanotubes (CNT for carbon nanotube, MWCNT for multi-walled CNT, SWCNT for single-walled CNT) as well as the various types of graphene (Balandin, A. A. Thermal properties of graphene and nanostructured carbon materials. *Nat. Mater.* 10, 569-581 (2011), which promotes the efficiency of heat transfer within the active material and therefore reduces the synthesis time. Owing to its low cost, carbon black (in particular acetylene black) is the best choice of susceptor. A mixture of a carbon black and a carbon with higher conductivity (CNT, graphene) may therefore offer a good cost/performance compromise.

The precursors are preferably placed in an environment essentially consisting of susceptor. For example, they may be deposited on a layer of susceptor and then covered with a layer of susceptor.

Reaction Substrate:

The reactants or precursors are placed in a substrate capable of withstanding the high temperatures to which the reaction mixture is heated. The substrate must not interact with the precursor materials. Preferably a material is selected that is not sensitive to microwaves, such as aluminium oxides, borosilicates, mullite refractories. For example, the synthesis may be carried out in a substrate of one of the following materials: alumina ($Al_2O_3$), silica ($SiO_2$).

Advantageously, the reaction is carried out in a crucible made of alumina ($Al_2O_3$), because i) its melting point of 2000° C. allows syntheses of material to be carried out in extreme temperature conditions and ii) it is white in colour, and therefore less sensitive to microwaves. As carbon is black, the microwaves are absorbed preferentially by the latter.

Preferably, the reaction mixture is isolated by at least one heat insulating material so as to promote concentration of heat within the mixture of reactants. This material must be inert in the reaction conditions. For example, rock wool may be used, or any element that can withstand high temperatures and has low sensitivity to microwaves, such as for example aluminium oxides, borosilicates, and mullite.

Thermal insulation of the upper part of the crucible is effected with the heat insulating material, notably rock wool, which is deposited on the susceptor surface, carbon or CuO, directly exposed to the air. The upper part of the crucible is therefore covered with the heat insulating material.

The Process Parameters:

The microwave energy supplied to the system as well as the weight of susceptor are two fundamental parameters to be controlled in order to perform synthesis of the material and allow complete synthesis thereof.

The total weight of the metallic precursors Sn and Sb is denoted by $m_{(MP)}$.

The weight of susceptor used is denoted by $m_{(S)}$.

The weights of the precursors and susceptor are preferably selected to satisfy the relation:

$0.1\ m_{(MP)} \leq m_{(S)} \leq 3000\ m_{(MP)}$

To control the energy supplied to the system, a new unit is employed, the specific energy. The specific energy defines the amount of energy transferred to one gram of susceptor (notably carbon or CuO) and is expressed in joules per gram of susceptor.

Preferably, to obtain complete synthesis of the intermetallic material, the specific energy must be greater than or equal to 24 000 J/g of susceptor, preferably greater than or equal to 27 000 J/g of susceptor, even better, greater than or equal to 30 000 J/g of susceptor.

The microwave power applied to the reaction mixture is denoted by P.

The synthesis time, which is the time during which the microwaves are applied, is denoted by t.

Advantageously, t is greater than or equal to 60 s, better still greater than or equal to 75 s.

Preferably, t is from 90 to 150 s, when carbon is used as susceptor.

Preferably, t is from 300 to 600 s, when CuO is used as susceptor.

Advantageously, an oven is used that is equipped with a sensor providing the core temperature of the sample and thus allowing the power to be regulated, for optionally shortening the process time. Advantageously, an oven is used that is equipped with a waveguide allowing better focusing of the waves on the sample/susceptor.

The use of a waveguide and increase in power are parameters that make it possible to reduce the synthesis time.

Intermetallic Phase SnSb:

Unexpectedly, during this synthesis in the open air, an oxide-free intermetallic phase is formed. This result is particularly remarkable as the elements Sn and Sb form oxides very easily.

The SnSb intermetallic phase obtained by the method of the invention is an alloy whose composition corresponds to one of the following formulae:

Sn:Sb(3:7), Sn:Sb(2:3), Sn:Sb(1:1), Sn:Sb(3:2) and Sn:Sb(7:3).

The SnSb material obtained by the method of the invention may be a mixture of several phases with different compositions.

It may comprise up to 50 mol % of impurities and/or of Sn and Sb present outside of the intermetallic phase.

Advantageously, the SnSb material obtained by the method of the invention comprises at most 50 wt % of impurities relative to the total weight of the material, preferably it comprises at most 10%, better still at most 5% of impurities by weight, relative to the total weight of the material.

Advantageously, the SnSb material obtained by the method of the invention comprises at most 50 wt % of Sn and/or of Sb not belonging to the intermetallic phase relative to the total weight of the material, preferably it comprises at most 10% of Sn and/or of Sb not belonging to the intermetallic phase, by weight relative to the total weight of the material.

Compared to the materials of the prior art, the material obtained by the method of the invention differs in its morphology and its electrochemical properties when it is employed in the manufacture of electrodes. It can therefore be seen that, compared to the materials of the prior art, the material of the invention is novel.

Uses:

The materials of the invention are used advantageously for manufacturing electrodes, in particular for manufacturing anodes. Advantageously, the SnSb intermetallic phase of the invention is prepared in finely divided form, for example in the form of powder, before being mixed with an electrically conducting material, a solvent and a binder to form an ink, and then deposited on a current collector, where it is dried to form an electrode.

The ink composition advantageously comprises from 50 to 90% of SnSb intermetallic phase, by weight of dry matter relative to the weight of dry matter in the composition, preferably from 60 to 80 wt %.

For making electrodes, any usual type of binder may be used, for example carboxymethylcellulose (CMC) in the presence of water, or poly(vinylidene fluoride) (PVDF) in the presence of N-methyl-2-pyrrolidone (NMP). A homogeneous architecture of the electrode is notably provided owing to the favourable interactions between CMC and the grains of active material and the electrically conducting fillers (carbon black). This architecture allows good mechanical stability of the film as well as good contact between the particles of the active material and the electrically conducting fillers (carbon). Moreover, CMC allows formation of a better passivation layer (denoted SEI, for "solid electrolyte interface"). The binder advantageously represents from 5 to 20 wt % of dry matter relative to the weight of dry matter in the composition, preferably from 8 to 15 wt %.

Electrically conducting filler means, in the sense of the invention, a filler having a volume resistivity from $1 \times 10^{-9}$ to 1 Ω·cm.

The electrically conducting filler may be selected for example from carbon fillers that conduct electricity.

These electrically conducting fillers may be in the form of particles, in the form of fibres, or a mixture of different types of fillers.

Among the carbon fillers in the form of particles, we may mention carbon black, acetylene black, nanoporous carbon, graphite (natural graphite, artificial graphite). An average diameter of primary particles from 0.002 to 20 µm and in particular from 0.025 to 10 µm is preferred for obtaining high electrical conductivity.

Among the carbon fillers in the form of fibres, we may mention carbon fibres, carbon nanotubes, carbon nanofibres.

The conductive filler preferably consists of at least one filler selected from the group consisting of carbon black, acetylene black, nanoporous carbon, graphite, carbon fibres, carbon nanotubes, and carbon nanofibres. The invention is preferably carried out with a filler selected from: mixtures of carbon black and of carbon fibres.

The electrically conducting filler is preferably incorporated in amounts in the range from 5 to 30 wt % of dry matter relative to the weight of dry matter in the composition.

The anode material thus prepared is capable of being lithiated and delithiated repeatedly, forming lithium-tin alloys and lithium-antimony alloys.

FIGURES

Figure 1B:
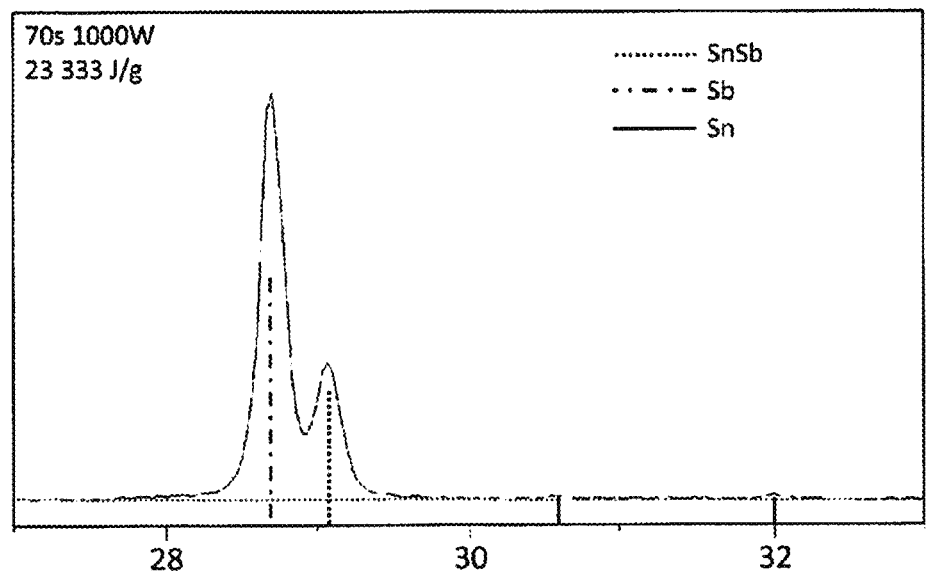
Figure 1C:
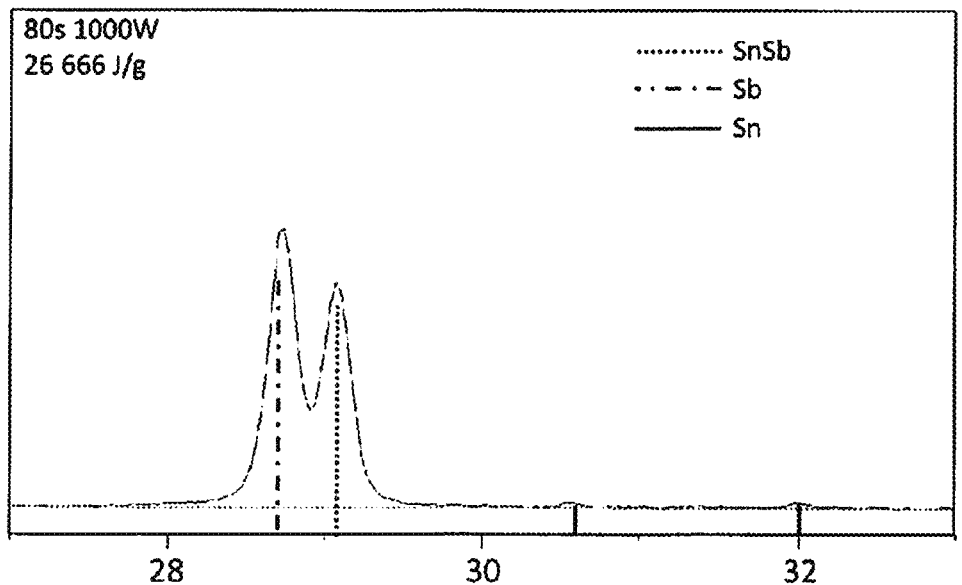
Figure 1D:
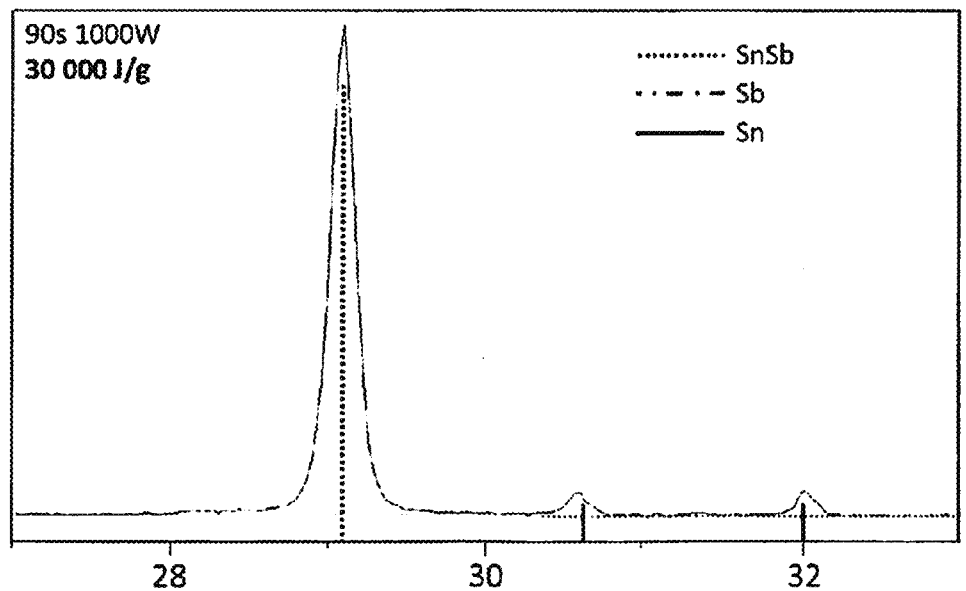
Figure 1E:
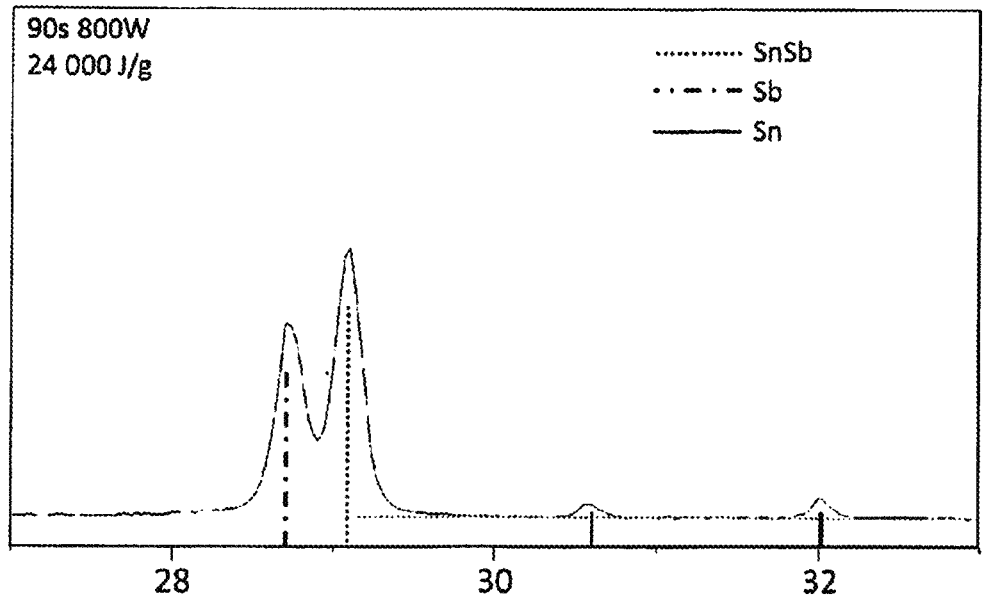
Figure 1F:
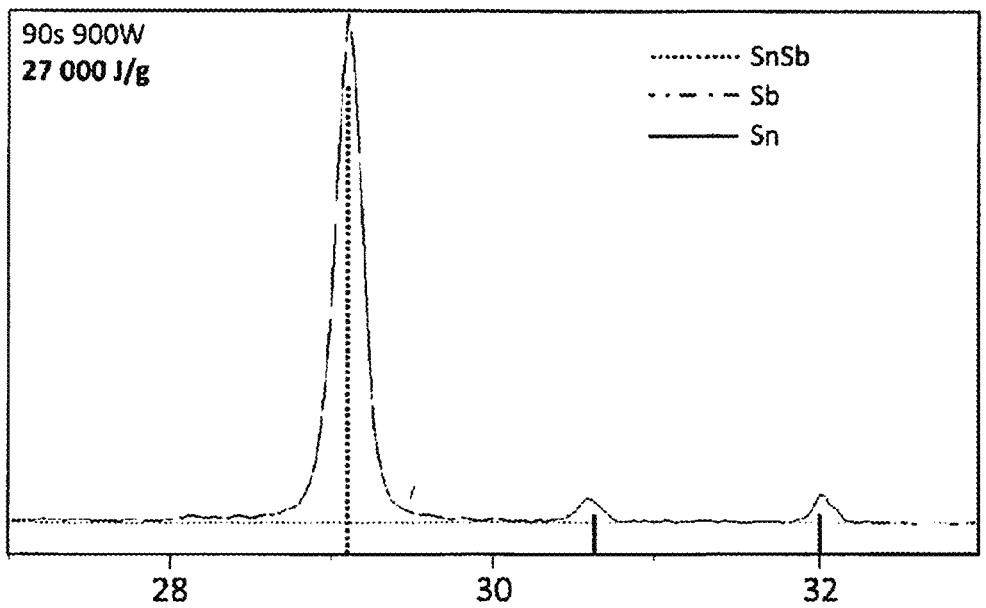
Figure 1G:
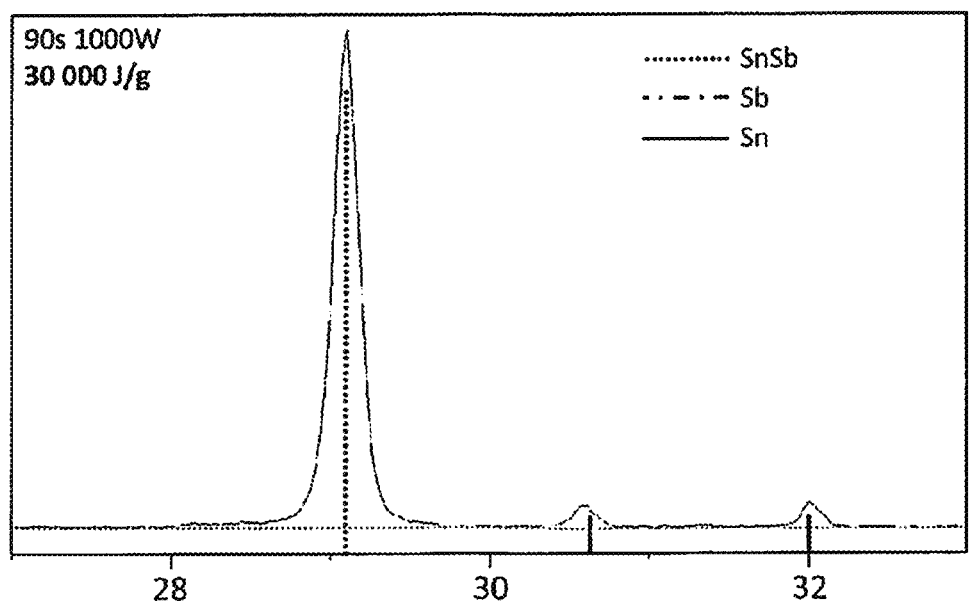

FIGS. 1a, 1b, 1c, 1d, 1e, 1f, 1g: X-ray diffraction patterns of the material Sn:Sb (1:1) obtained in different synthesis conditions. FIGS. 1a, 1b, 1c, 1d: X-ray patterns of the material Sn:Sb (1:1) obtained using a fixed microwave oven power and a variable time. FIGS. 1e, 1f, 1g: X-ray patterns of the material Sn:Sb (1:1) obtained using fixed time and variable power.

The ordinate represents the intensity in arbitrary units.

The abscissa represents the angle between the incident beam (source) and the diffracted beam (detector) in degrees $2\theta$.

FIG. 1a The synthesis time is 60 seconds with an applied power of 1000 W (i.e. a specific energy of 20 000 J/g).

FIG. 1b The synthesis time is 70 seconds with an applied power of 1000 W (i.e. a specific energy of 23 333 J/g)

FIG. 1c The synthesis time is 80 seconds with an applied power of 1000 W (i.e. a specific energy of 26 666 J/g)

FIG. 1d The synthesis time is 90 seconds with an applied power of 1000 W (i.e. a specific energy of 30 000 J/g).

FIG. 1e The synthesis time is 90 seconds with an applied power of 800 W (i.e. a specific energy of 24 000 J/g)

FIG. 1f The synthesis time is 90 seconds with an applied power of 900 W (i.e. a specific energy of 27 000 J/g)

FIG. 1g The synthesis time is 90 seconds with an applied power of 1000 W (i.e. a specific energy of 30 000 J/g)

Figure 2A:
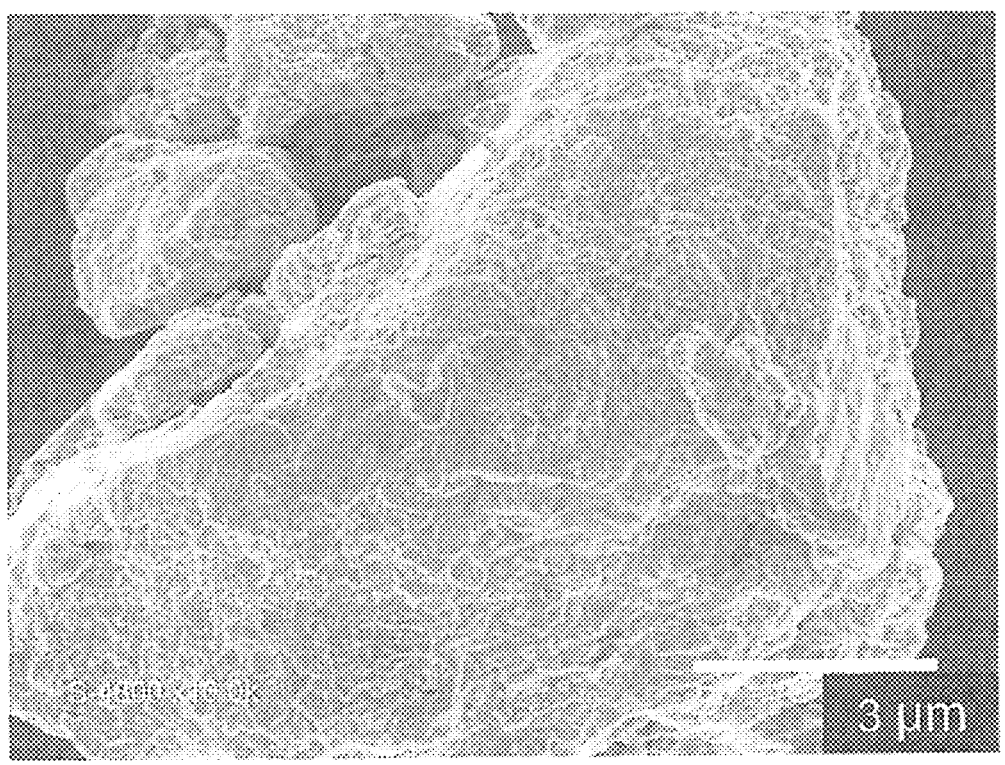
Figure 2:
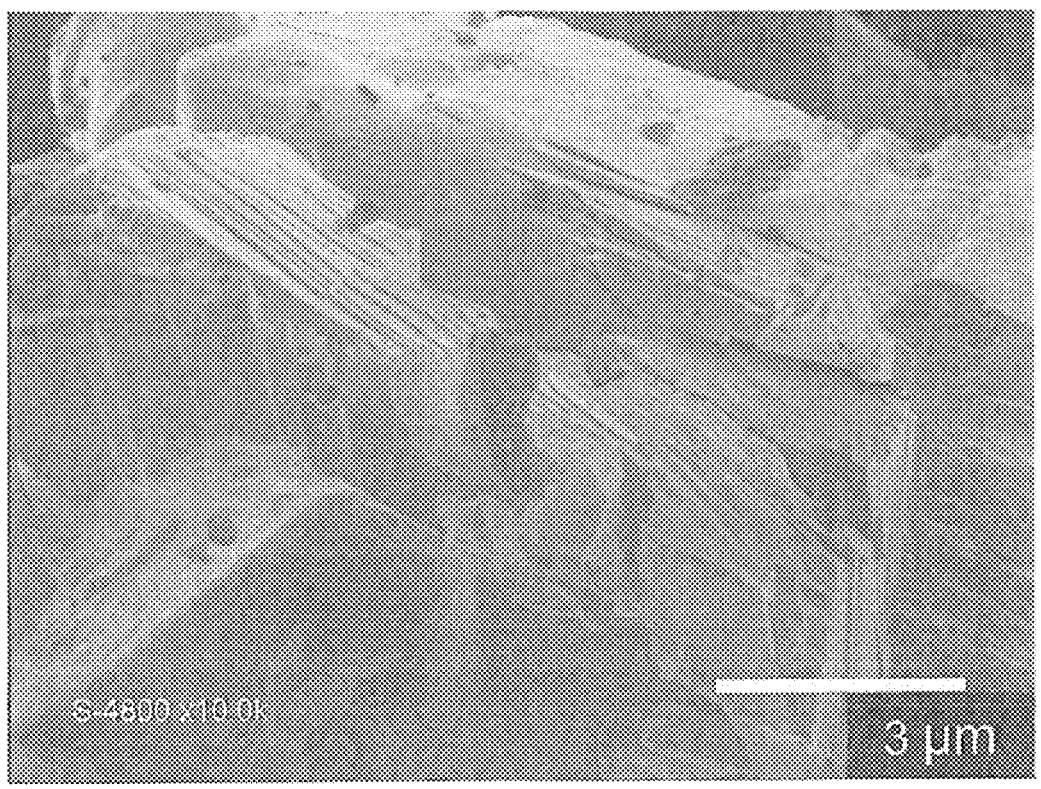

FIGS. 2a and 2b: Images from scanning electron microscopy. FIG. 2a: material from mechanosynthesis; FIG. 2b: material from microwave synthesis.

Figure 3:
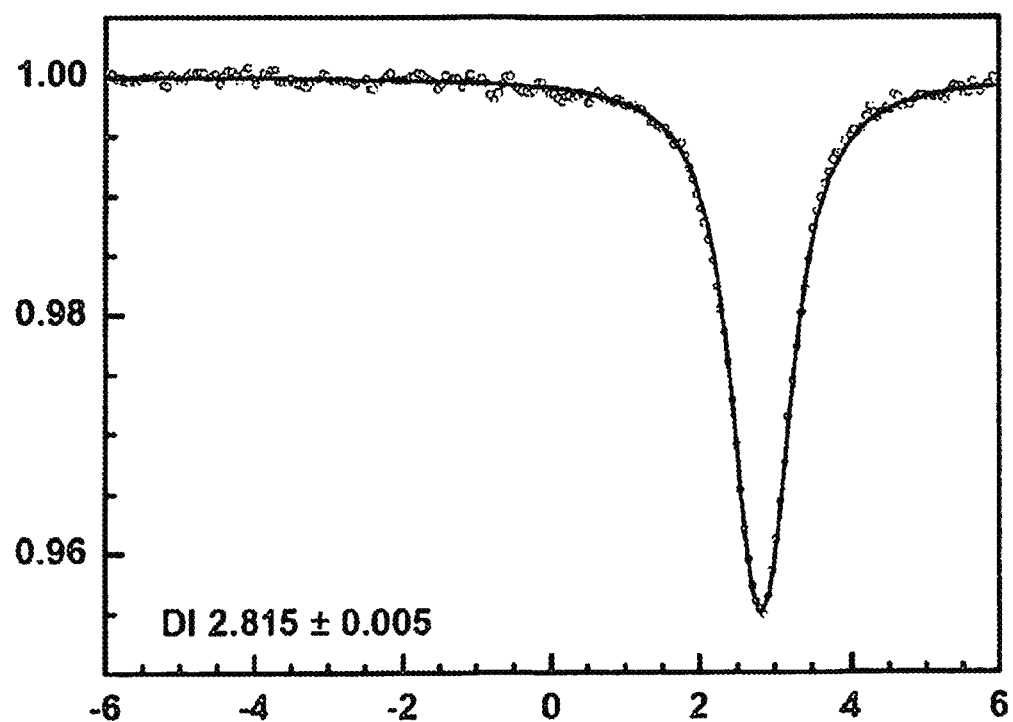

FIG. 3: Mössbauer $^{119}$Sn spectrum of the product Sn:Sb (1:1) made at room temperature. The abscissa represents the speed in mm/s and the ordinate represents the transmission (scale from 0 to 1).

The circles are associated with the experimental points obtained during acquisition.

The solid line represents the spectrum calculated after refinement. An isomeric shift of 2.815 (relative to the source $BaSnO_3$) corresponds to the material SnSb.

Figure 4:
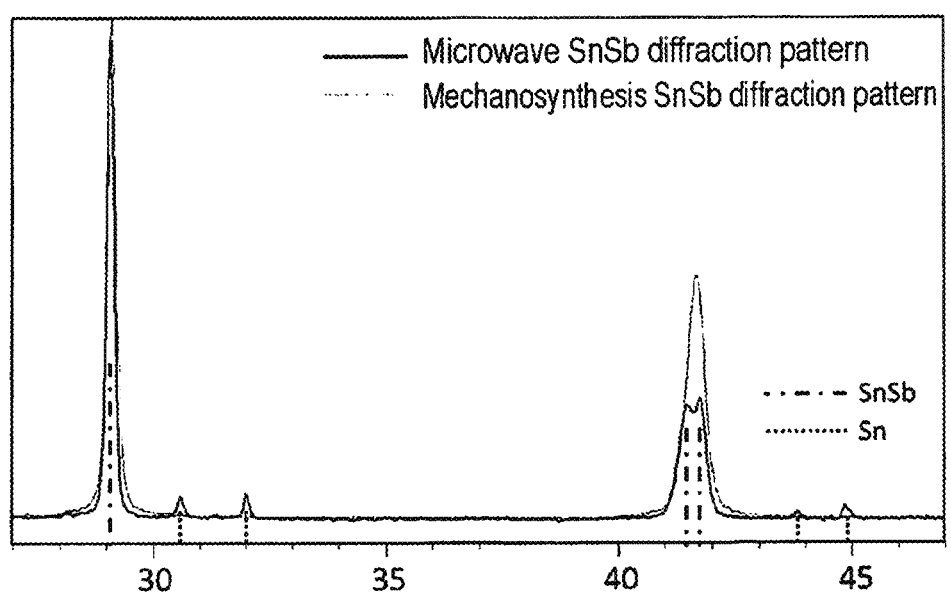

FIG. 4: X-ray diffraction pattern of Sn:Sb (1:1) prepared by microwave synthesis (in black) and by mechanosynthesis (in grey).

EXPERIMENTAL SECTION

I—Materials and Methods:
Raw Materials

Tin: the tin used was that marketed by the company Sigma under reference 14509, of 99% purity, or the tin marketed by the company Alfa Aesar under reference 10378, of 99.5% purity, with particle diameter of 149 μm.

Antimony: the antimony used was that marketed by the company Alfa Aesar under reference 7440-36-0, of 99.5% purity, with particle diameter of 44 μm.

Susceptor: In some examples, the carbon C-Nergy Super C45 Timcal (~3 g) was used. In other examples, CuO marketed by the company Labosi (Fischer Scientific/Acros Organics) under reference 405862500 was used.

Crucible: a crucible made of alumina ($Al_2O_3$) was used. The weight of the crucible is 123 grams, with an internal volume of about 60 cm$^3$.

Rock wool: The upper part of the crucible is heat-insulated with rock wool, which is deposited on the carbon surface directly exposed to the air. The upper part of the crucible is therefore covered with rock wool.

Microwave oven: in some examples, a laboratory microwave oven was used (designated P) (Milestone, Start-Synth®, 1200 W); in other examples, a domestic microwave oven was used (designated D) (Panasonic, NN-SD459 W, 1000 W).

The StartSynth, Milestone® microwave oven consists of a single magnetron provided with a rotating diffuser (stirrer) allowing uniform scattering of the waves within the housing. The waves are reflected and then focused (characteristic of multimode operation) on the central zone of the microwave oven in order to irradiate the sample(s) uniformly. Focusing the waves on a defined zone makes it possible to reduce the synthesis time and the energy losses. The maximum useful power supplied is 1200 W. Monomode operation of a microwave oven focuses all of the waves on the sample (restricted zone) via a waveguide. The energy density in monomode is higher than in multimode (at equal power).

—Protocol

The (metallic) precursors in the form of powder in 50/50 molar amount are placed directly in the carbon (susceptor) contained in a crucible, then covered with a thickness of 1-2 cm of this same susceptor and placed in a microwave oven.

Air cooling is used. However, if synthesis is carried out with a container (precursors covered with carbon inside a silica tube for example; the whole is embedded in the carbon), it is possible to perform a water quench. The products are collected in the form of ingots, and are then ground in a mortar for characterization (XRD, Mössbauer, electrochemistry).

Examples 1 to 4: According to the Invention

The details of the parameters of the protocol are stated in Table 1.

TABLE 1

| Synthesis conditions for SnSb | | | | |
|---|---|---|---|---|
| | Ex1 | Ex 2 | Ex3 | Ex 4 |
| Susceptor | CuO | C | C | C |
| Susceptor weight (g) | 7 | 3 | 3 | 3 |
| Precursor weight (g) | 0.4 | 0.4 | 0.5 | 2.5 |
| Oven | D | D | P | P |
| Power (W) | 1000 | 1000 | 1000 | 1000 |
| Time (s) | 600 | 420 | 90 | 150 |
| Specific energy (J/g of susceptor) | 85714 | 140 000 | 30 000 | 50 000 |

Counter-Examples

Tests following the same protocol are carried out with other starting materials. The conditions are summarized in Table 2.

TABLE 2

| Testing Conditions | |
| --- | --- |
| | Ta$_2$Sn$_3$ |
| Precursor 1 (P1) | Ta |
| Precursor 2 (P2) | Sn |
| Molar ratio P1/P2 | 2/3 |
| Susceptor | Carbon |
| Susceptor weight (g) | 3 |
| Precursor weight (g) | 0.5 |
| Oven | P |
| Power (W) | 1000 |
| Time (s) | 210 |
| Specific energy (J/g of susceptor) | 70 000 |

Tantalum-Tin Alloy

The tantalum-tin phase diagram consists of two phases, Ta$_3$Sn and Ta$_2$Sn$_3$. These alloys are essentially considered for their properties of superconductivity.

Microwave synthesis does not allow the binary Ta:Sn (2:3) to be obtained. No reaction is detected between the two precursors.

—Determination of the Optimum Specific Energy:

The specific energy defines the amount of energy transferred to a gram of susceptor (carbon) and is expressed in joules per gram of susceptor.

We tried to evaluate the minimum specific energy necessary for complete synthesis of the material Sn:Sb (1:1). This determination is carried out according to two methods. According to a first protocol, the time varies while the power is fixed and according to the second protocol the inverse is used, fixing the time and varying the power. All the syntheses are performed with a weight of precursors of 0.5 grams and a weight of susceptor of about 3 grams.

FIGS. 1a, 1b, 1c, and 1d represent the variation of the X-ray diffraction patterns for synthesis of the material Sn:Sb (1:1) using fixed power and variable time. FIGS. 1e, 1f, and 1g represent the variation of the X-ray patterns for synthesis of the material Sn:Sb (1:1) using fixed time and variable power.

It can be seen that complete synthesis of the material SnSb is possible with a minimum specific energy of 27 000 J/g. Taking into account the uncertainty of the parameters (of the order of 10 seconds or 100 W), a margin of error must be applied; on this basis the minimum specific energy necessary for complete synthesis of the material SnSb can be estimated at 27 000±3000 J/g.

—Determination of the Optimum Synthesis Time:

A value of specific energy of 30 000 J/g is adopted and the parameters (power or time) are selected in order to reach this value.

A power of 400 W with a time set at 225 seconds allows SnSb to be synthesized.

When the maximum power of the microwave oven (1200 W) is used without focusing the waves on the sample, with a synthesis time of 75 seconds, it is found that the synthesis of SnSb is incomplete: both tin and antimony are still present. These two last-mentioned tests demonstrate that a minimum synthesis time is necessary for obtaining complete synthesis. All of the syntheses carried out in the laboratory show that a synthesis time greater than or equal to 90 s with a power of 1200 W makes it possible to obtain complete synthesis. If higher power were to be used, or if the microwave oven focuses the waves on the sample (monomode), the synthesis time could be reduced.

—Methods of Characterization:

X-ray diffraction (XRD): A Panalytical Empyrean® instrument was used (Cu Kα radiation, θ-θ diffractometer).

Mössbauer $^{119}$Sn spectrometry (γ-ray source: Ba$^{119m}$SnO$_3$, transmission spectrometer): it is verified whether an amorphous oxide, SbO$_x$, not detected by XRD, is present. A shoulder around an isomeric shift of 0 is indicative of the presence of a tin oxide. FIG. 3 does not show any shoulder and confirms the absence of SbO$_x$.

—Electrochemistry:

Step 1: making the ink: Sn:Sb (1:1) synthesized by microwave is formed in order to be tested in electrochemistry. An ink is made and then is spread on a copper sheet serving as current collector. The details of the composition of the ink and its preparation are given in Table 3. The four products are mixed in a mortar and then placed in an agate jar (internal volume: 13 cm$^3$) with 4 balls with a diameter of 6 mm.

The ink is formulated with 0.82 ml of ultrapure water, to a weight of active material of 200 mg. Mechanical grinding for one hour at 500 rev/min is applied.

The carbon black is marketed by the company SN2A under reference Y50A.

The carbon fibres are marketed by the company Showa Denko under reference VGCF type H.

The carboxymethylcellulose (carboxymethylcellulose sodium with a degree of substitution of 0.7) is marketed by the company Sigma Aldrich under reference 419311.

TABLE 3

| composition of the ink | | | |
| --- | --- | --- | --- |
| Active material (SnSb) | Carbon black | Carbon fibres | CMC (carboxymethylcellulose) |
| wt % 70 | 9 | 9 | 12 |
| Weight (mg) 200 | 25.71 | 25.71 | 34.29 |

Step 2: Preparation of the Electrodes

The SnSb ink is deposited using a knife (height of the deposit: 132.5 μm) on a copper sheet with a thickness of 17.5 μm. The film is air-dried for 24 h at room temperature followed by drying at 120° C. under vacuum for 12 h. The thickness of the dried electrode (copper sheet plus ink) is about 40 μm. Electrodes with diameter of 15 mm are cut out using a punch.

Step 3: Assembly of a Button Cell

The SnSb MO electrodes thus prepared are tested in a button cell. The separator is Whatman paper (Ref: GF/D 1823070). Details of the constituents of the electrolyte are shown in Table 4.

TABLE 4

| Composition of the electrolyte | | | | | |
| --- | --- | --- | --- | --- | --- |
| | Solvents | | | Additives | |
| | | | | | FEC |
| Li salt | EC (ethylene carbonate) | PC (propylene carbonate) | DMC (dimethyl carbonate) | VC (vinylene carbonate) | (fluoro- ethylene carbonate) |
| LiPF$_6$ | | | | | |
| Concentration 1 mol/L | 1 | 1 | 3 | 1 vol % | 5 vol % |

Step 4: Electrochemical Performance

The electrochemical results for the electrode made from SnSb produced according to example 4 are shown in Table 5.

TABLE 5 electrochemical performance of SnSb obtained according to example 4

| Theoretical capacity | 825 mAh/g |
|---|---|
| Comments | Synthesis extremely easy and quick, aqueous electrode formulation Low irreversible capacity in the 1st cycle |
| Reversible specific capacity 1st cycle (mAh/g) | 865/755 *Calculated relative to SnSb |
| Irreversible exp. capacity in the 1st cycle (%) | 13% |
| Specific capacity (≈100 mA/g) after 300 cycles | 400 mAh/g |
| Volume capacity after 100 cycles | 3600 mAh/cm$^3$ |
| Coulombic efficiency 1st cycle (%) | 87 |
| Coulombic efficiency 300th cycle (%) | ≈100 |

—Comparison with a Material from Mechanosynthesis:

Preparation of SnSb by mechanosynthesis: this synthesis is carried out following the protocol described by Darwiche, A., Sougrati, M. T., Fraisse, B., Stievano, L. & Monconduit, L. Easy synthesis and long cycle life of SnSb as negative electrode material for Na-ion batteries. *Electrochem. commun.* 32, 18-21 (2013).

The material from example 3 and the material obtained by mechanosynthesis were analysed by scanning electron microscopy and by X-ray diffraction.

Scanning Electron Microscopy:

The images obtained by SEM are shown in FIGS. 2a and 2b. FIG. 2a corresponds to the material obtained by mechanosynthesis and FIG. 2b corresponds to the material of the invention, example 3. The particles resulting from mechanosynthesis have pronounced surface roughness. However, the SnSb material of the invention is obtained in the form of ingots after microwave synthesis. When these are broken up, we discover highly faceted fragments. The surface is smooth and reveals organization similar to superposition of planes.

X-Ray Diffraction (FIG. 4):

The diffraction pattern of the SnSb from example 3 shows an excess of tin, in contrast to that of SnSb prepared by mechanosynthesis. The presence of a peak of Sn on a diffraction pattern was thought to be due to the presence of 5% of residual Sn, possibly less. A small proportion of antimony is probably in amorphous form (and therefore not detectable by X-ray diffraction) or will potentially enrich the SnSb phase.

The work by Withers, R. L. et al., Old friends in a new light: "SnSb" revisited, 179, 404-412 (2006), describes an SnSb intermetallic phase prepared in an oven for 3 months at 270° C. followed by recasting and then quenching. The diffraction pattern from this work is identical to the SnSb obtained by the method of the invention (example 3). The method of synthesis described in this prior art is not industrially applicable.

The invention claimed is:

1. Method for preparing a material having an Sn:Sb intermetallic phase, wherein the material comprises at most 5 wt % of impurities, relative to a total weight of the material and wherein the material comprises at most 10 wt % of Sn and/or of Sb not belonging to the intermetallic phase, relative to a total weight of the material, said method comprising at least the following steps:
   a/ mixing precursors consisting essentially of chemical elements Sn and Sb in solid form, and
   b/ treating the mixture from step a/ with microwaves,
   wherein the chemical elements Sn and Sb are in contract with a susceptor material for carrying out the treatment of step b/ with microwaves, and a specific energy of the treatment carried out in step b/ is greater than or equal to 24,000 J per g of susceptor, and
   wherein, with $m_{(MP)}$ denoting a total weight of the chemical elements Sn and Sb, and $m_{(S)}$ denoting a weight of susceptor, these weights satisfy the relation: $0.1\ m_{(MP)} \leq m_{(S)} \leq 3000\ m_{(MP)}$.

2. Method according to claim 1, wherein the chemical elements Sn and Sb are used in a molar proportion selected from the group consisting of 30/70, 40/60, 50/50, 60/40, and 70/30.

3. Method according to claim 1, wherein a duration of step b/ is greater than or equal to 60 s and less than or equal to 600 s.

4. Method according to claim 1, wherein the specific energy of the treatment carried out in step b/ is greater than or equal to 30,000 J per g of susceptor.

5. Method according to claim 1, wherein the susceptor material is a solid.

6. Method according to claim 5, wherein the susceptor material is selected from the group consisting of carbon and CuO.

7. Method according to claim 6, wherein the susceptor material is carbon and a duration of microwave treatment is from 90 s to 150 s.

8. Method according to claim 6, wherein the susceptor material is CuO and a duration of microwave treatment is from 300 s to 600 s.

9. Method according to claim 1, wherein the chemical elements Sn and Sb are used in a form of powder or pellets.

10. Method according to claim 1, wherein the method is carried out in a substrate made of one of the following materials: alumina ($Al_2O_3$), silica ($SiO_2$).

11. Method according to claim 1, wherein the material having an Sn:Sb intermetallic phase corresponds to one selected from the group consisting of: Sn:Sb (3:7), Sn:Sb (2:3), Sn:Sb (1:1), Sn:Sb (3:2), and Sn:Sb (7:3).

12. Method for manufacturing an electrode, said method comprising at least:
   (1) manufacturing a material having an Sn:Sb intermetallic phase according to claim 1,
   (2) forming the material from step (1) in a form of powder,
   (3) mixing the powder from step (2) with carbon, a binder and a solvent to form an ink,
   (4) coating a current collector with the ink, and
   (5) drying the electrode.

* * * * *